3,097,193
METHOD OF CURING POLYMERIC MATERIALS
AND PRODUCT THEREOF
Jerry T. Gruver, Bartlesville, Okla., assignor to Phillips Petroleum Company, a corporation of Delaware
No Drawing. Filed Sept. 8, 1960, Ser. No. 54,583
23 Claims. (Cl. 260—85.1)

This invention relates to a method of curing polymeric materials. In one of its aspects, the invention relates to the process of reacting polymeric materials with an improved curing system. In another aspect, this invention relates to the resulting cured products of this process. In a further aspect, the invention relates to a method of curing polymers with multifunctional aziridinyl compounds and the cured product thereof. In yet another aspect, the invention relates to a method of curing telechelic polymers in the presence of carbon black and the cured product thereof. In still another aspect, the invention relates to a method of curing liquid telechelic polymers with carboxy, hydroxy, and similar end groups, both in gum stocks and in the presence of carbon black, and the cured product thereof. In another aspect, the invention relates to a method of augmenting the peroxide or sulfur cure of high Mooney telechelic polymers with similar end groups, and the cured product thereof. In a still further aspect, the invention relates to a method of utilizing multi-function aziridinyl compounds selected from the group consisting of 1-aziridinyltriazines and 1-aziridinyltriphosphatriazines as curatives for polymeric materials.

Many polymeric materials, particularly the unsaturated rubbery polymers, require a curing or cross linking treatment to place them in a useful condition or extend the scope of their usefulness. In addition, other polymers such as polyethylene or polypropylene can be improved in certain properties, i.e., thermal stability, by cross linking. Several chemical curatives are well known and are in commercial use. Each has its peculiar advantages but frequently gains made in one property of the polymer are at the expense of another property.

It has now been found that 1-aziridinyltriazines and 1-aziridinyltriphosphatriazines, which contain at least three aziridinyl substituents, are excellent curatives for a wide variety of polymers ranging from liquids to rubbers to plastics (such as natural rubber, conjugated diene homopolymers, copolymers of conjugated dienes with compounds containing a $CH_2=C<$ group, olefin polymers such as polyethylene and polypropylene, copolymers and of monoolefins such as ethylene-propylene and ethylene-butene copolymers) and are particularly effective for curing polymers containing terminally reactive groups such as hydroxy groups and carboxy groups. These curatives are effective in both gum and reinforced stocks, the latter including carbon black and mineral fillers. They can be used alone as curatives for polymers having terminally reactive groups or in conjunction with auxiliary curatives such as organic peroxides or curatives for both polymers having terminaly reactive groups and the other polymers described above. Peroxides are of particular importance when curing a solid or rubbery polymer.

It is known that liquid polymers containing terminally reactive groups can be cured by reacting the said groups with different types of di- and polyfunctional reagents. Generally, however, when it is desired to have present in the composition a reinforcing agent such as carbon black, curing is very difficult and in some instances, the level of cure is not sufficient to produce elastomeric products. One of the advantages of the present invention is that the aziridinyltriazine-type compounds are effective curatives for liquid polymers in the presence of carbon black as well as in its absence.

Aziridinyltriazine-type compounds have numerous other advantages as curatives. When used in conjunction with organic peroxides for curing rubbery polymers, the products generally have a lower heat build-up than corresponding compositions cured with organic peroxides alone, and in many instances, improvements are noted in tensile strength and resilience.

According to the present invention, interesting products can be produced by reacting one of a 1-aziridinyltriazine and 1-aziridinyltriphosphatriazine with a polymer. More particularly according to the invention, one or more of these triazines is reacted with a polymeric material to cure, cross-link or otherwise modify the same to obtain a product having improved properties. Still further, according to the present invention, there is provided a process which comprises reacting a polymeric material with a reactant material selected from the group consisting of compounds of formulas

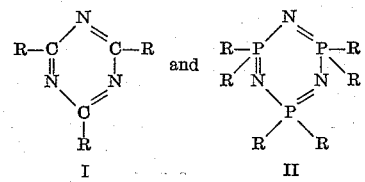

wherein R is a radical selected from the group consisting of a 1-aziridinyl radical which can be represented by formula

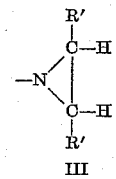

III hydrogen, and alkyl, cycloakyl, aryl, aralkyl, and alkaryl radical, each hydrocarbon radical containing from 1 to 12 carbon atoms, and R' is selected from the group consisting of hydrogen, alkyl, cycloakyl, aryl, aralkyl, and alkaryl radicals, the R's in each aziridinyl radical containing up to and including a total of 20 carbon atoms. In the foregoing formulas, at least three of the R groups are 1-aziridinyl. Thus, each of the R groups in Formula I is an aziridinyl radical.

As set out herein, one skilled in the art, in possession of this disclosure, having studied the same, will recognize that the polymeric materials which can be used are those which, when brought together with the curing or reacting agents of this invention, will react therewith at a point of reactivity of the polymer at an atmospheric or elevated temperature.

Therefore, it is an object of this invention to provide a method of curing polymeric materials with an improved curing system. Another object of this invention is to provide a method of curing liquid telechelic polymers in the presence of carbon black as well as in its absence. Another object of this invention is to provide a method of curing both gum and reinforced stocks. Yet another object of this invention is to provide a method of augmenting the peroxide or sulfur cure of high Mooney telechelic polymers. Another object of this invention is to provide a method of curing polymers to give products having lower heat buildup and/or improvements in tensile strength and resilience. Another object of this invention is to provide a method of increasing the cure rate of polymeric materials.

Other aspects, objects and the several advantages of this invention will be apparent from a study of the disclosure and the appended claims.

The materials which can be treated for improvements in properties according to our invention are natural rubber, synthetic polymers of monomers containing a vinylidene group and synthetic polymers having the formula $AY_n$ wherein A comprises a polymer of monomers containing a vinylidene group, Y is a terminally reactive group, such as a hydroxy group, a mercapto group, a primary or secondary amino group, an acyl group, and an acidic group, and $n$ is an integer of at least 2 and generally 2, 3 or 4. Included among these polymers are homopolymers of conjugated dienes having from 4 to 12 carbon atoms, preferably the polymers of conjugated dienes having 4 to 8 carbon atoms per molecule, such as

| | |
|---|---|
| 1,3-butadiene | Phenylbutadiene |
| Isoprene | 3,4-dimethyl-1,3-hexadiene |
| Piperylene | 4,5-diethyl-1,3-octadiene |
| Methylpentadiene | Chloroprene |
| 2-methyl-1,3-hexadiene | Fluoroprene | and the like. Among these, butadiene, isoprene and piperylene are preferred. In addition to the conjugated dienes, other monomers which can be employed are isobutylene; aryl-substituted olefins, such as styrene, various alkyl styrenes, such as vinyltoluene, para-methoxystyrene, vinylnaphthalene, and the like; heterocyclic nitrogen-containing monomers, such as pyridine and quinoline derivatives containing at least one vinyl or alpha-methylvinyl group, such as

| | |
|---|---|
| 2-vinylpyridine | 2-ethyl-5-vinylpyridine |
| 3-vinylpyridine | 2-methyl-5-vinylpyridine |
| 4-vinylpyridine | 3,5-diethyl-4-vinylpyridine | etc.; similar mono- and di-substituted alkenyl pyridines and like quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.

Polymers containing acidic groups along the polymer chain, such as polymers of acrylic acid or methylacrylic acid, can be cured with this system. The curing system of this invention can also be used to treat polymers of monoolefins having 2 to 8 carbon atoms such as polyethylene, polypropylene, polybutene, copolymers of ethylene with propylene or 1-butene, and the like.

The process of this invention has particular utility in treating terminally reactive polymers containing terminal acidic groups. As used herein, the term "terminally reactive polymer" denotes a polymer containing a reactive group on both ends of the polymer chain. Polymers containing terminal acidic groups can be prepared from polymers containing terminal alkali metal atoms.

The above compounds, in addition to being polymerizable alone, are also copolymerizable with each other and may be copolymerized to form terminally reactive polymers. In addition, copolymers can be prepared using minor amounts of copolymerizable monomers containing more than one vinylidene group such as

| | |
|---|---|
| 2,4-divinylpyridine | 3,5-divinylpyridine |
| Divinylbenzene | 2,4-divinyl-6-methylpyridine |
| 2,3-divinylpyridine | 2,3-divinyl-5-ethylpyridine | and the like.

The terminally reactive polymers in addition to including homopolymers and copolymers of the above materials also include block copolymers, which are formed by polymerizing a monomer onto the end of a polymer, the monomer being introduced in such a manner that substantially all of the co-reacting molecules enter the polymer chain at this point. In general, the block copolymers can include combinations of homopolymers and copolymers of the materials hereinbefore set forth. A detailed description of block copolymers containing thermal reactive groups and their method of preparation is set forth in the copending application of R. P. Zelinski, Serial No. 796,277, filed March 2, 1959. This application describes a process for preparing block copolymers from monomers included in the following groups: (1) 1,3-butadiene, 2-methyl-1,3-butadiene, 1,3-pentadiene and vinyl-substituted aromatic hydrocarbons, (2) vinylpyridines, and (3) vinyl halides, vinylidene halides, acrylonitrile, esters of acrylic acid and esters of homologues of acrylic acid. The process comprises the steps of initially contacting a monomer selected from those included in groups (1) and (2) with an organolithium compound in the presence of a diluent selected from the group consisting of aromatic, paraffinic and cycloparaffinic hydrocarbons so as to form a polymer block; and, after polymerization of substantially all of the selected monomer, contacting the aforementioned catalyst in the presence of the polymer block initially formed and the hydrocarbon diluent with a monomer selected from those included in groups (1), (2), and (3) when the initial monomer is selected from group (1) and with a monomer selected from those included in group (3) when the initial monomer is selected from group (2), the monomer selected being different from the monomer employed in the initial contacting.

The terminally reactive polymers are prepared by contacting the monomer or monomers which it is desired to polymerize with an organo polyalkali metal compound. The organo polyalkali metal compounds preferably contain from 2 to 4 alkali metal atoms, and those containing 2 alkali metal atoms are more often employed. As will be explained hereinafter, lithium is preferred alkali metal.

The organo polyalkali metal compounds can be prepared in several ways, for example, by replacing halogens in an organic halide with alkali metals, by direct addition of alkali metals to a double bond, or by reacting an organic halide with a suitable alkali metal compound.

The organo polyalkali metal compound initiates the polymerization reaction, the organo radical being incorporated in the polymer chain and the alkali metal atoms being attached at each end of the polymer chain. The polymers in general will be linear polymers having two ends; however, polymers containing more than two ends can be prepared within the scope of the invention. The general reaction can be illustrated graphically as follows:

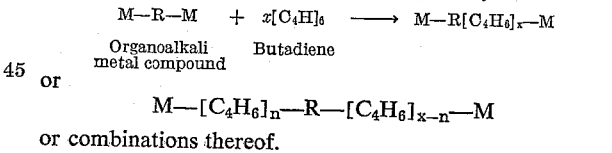

or $$M-[C_4H_6]_n-R-[C_4H_6]_{x-n}-M$$

or combinations thereof.

A specific example is:

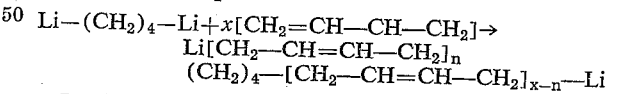

In the specific example, 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of monoterminally reactive polymer, that is, polymer having alkali metal at only one end of the chain is substantially higher. The alkali metals, of course, include sodium, potassium, lithium, rubidium, and cesium. The organic radical of the organo polyalkali metal compound can be an aliphatic, cycloaliphatic or aromatic radical. For example, di- and polyalkali metal substituted hydrocarbons can be employed including:

1,4-dilithiobutane
1,5-dipotassiopentane
1,4-disodio-2-methylbutane
1,6-dilithiohexane
1,10-dilithiodecane
1,15-dipotassiopentadecane 1,20-dilithioeicosane
1,4-disodio-2-butene
1,4-dilithio-2-methyl-2-butene
1,4-dilithio-2-butene
1,4-dipotassio-2-butene
Dilithionaphthalene
Disodionaphthalene
4,4'-dilithiobiphenyl
Disodiophenanthrene
Dilithioanthracene
1,2-dilithio-1,1-diphenylethane
1,2-disodio-1,2,3-triphenylpropane
1,2-dilithio-1,2-diphenylethane
1,2-dipotassiotriphenylethane
1,2-dilithiotetraphenylethane
1,2-dilithio-1-phenyl-1-naphthylethane
1,2-dilithio-1,2-dinaphthylethane
1,2-disodio-1,1-diphenyl-2-naphthylethane
1,2-dilithiotrinaphthylethane
1,4-dilithiocyclohexane
2,4-disodioethylcyclohexane
3,5-dipotassio-n-butylcyclohexane
1,3,5-trilithiocyclohexane
1-lithio-4-(2-lithio-4-methylphenyl)butane
1,2-dipotassio-3-phenylpropane
1,2-di(4-lithiobutyl)benzene
1,3-dilithio-4-ethylbenzene
1,4-dirubidiobutane
1,8-dicesiooctane
1,5,12-trilithiododecane
1,4,7-trisodioheptane
1,4-di(1,2-dilithio-2-phenylethyl)benzene
1,2,7,8-tetrasodionaphthalene
1,4,7,10-tetrapotassiodecane
1,5-dilithio-3-pentyne
1,8-disodio-5-octyne
1,7-dipotassio-4-heptyne
1,10-dicesio-4-decyne
1,11-dirubidio-5-hendecyne
1,2-disodio-1,2-diphenylethane
Dilithiophenanthrene
1,2-dilithiotriphenylethane
Dilithiomethane
1,4-dilithio-1,1,4,4-tetraphenylbutane
1,4-dilithio-1,4-diphenyl-1,4-dinaphthylbutane and the like.

While the organo dialkali metal initiators in general can be employed, certain specific initiators give better results than others and are preferred in carrying out the preparation of the terminally reactive polymers. For example, of the condensed ring aromatic compounds, the lithium anthracene adduct is preferred, but the adducts of lithium with naphthalene and biphenyl can be employed with good results. Of the compounds of alkali metals with polyaryl-substituted ethylenes, the preferred material is 1,2-dilithio-1,2-diphenylethane (lithium-stilbene adduct). In many instances, the compounds which are formed are mixtures of mono- and dialkali metal compounds, which are less effective in promoting the formation of the terminally reactive polymers. The organo dialkali metal compounds, which have been set forth as being preferred, are those which when prepared contain a minimum of the monoalkali metal compound.

The amount of initiator which can be used will vary, depending upon the polymer prepared, and particularly the molecular weight desired. Usually the terminally reactive polymers are liquids, having molecular weights in the range of 1,000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between $-100$ and $+150°$ C., preferably between $-75$ and $+75°$ C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent, such as

| Benzene | n-Butane |
| Toluene | n-Hexane |
| Cyclohexane | n-Heptane |
| Methylcyclohexane | Isooctane |
| Xylene | Mixtures of above | and the like. Generally the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures. Since it is desirable to obtain a maximum yield of terminally reactive polymer, it is within the scope of this invention to use separation procedures, particularly with alkali metal initiators other than lithium compounds, to separate terminally reactive polymer from the polymer product.

The terminally reactive polymers prepared as hereinbefore set forth contain an alkali metal atom on each end of the polymer chain and the organic radical of the initiator is present in the polymer chain. These terminally reactive polymers are treated with suitable reagents such as carbon dioxide, sulfuryl chloride, etc., and upon hydrolysis provide polymers containing terminal acidic groups. The acidic groups include groups such as

| SOH | SbOH |
| $SO_2H$ | $SbO_3H$ |
| $SO_3H$ | $TeO_2H$ |
| COOH | $TeO_3H$ |
| $SeO_2H$ | $AsO_2H$ |
| $SeO_3H$ | AsOH |
| $SiO_2H$ | $AsO_3H_2$ |
| $SnO_2H$ | $AsO_3H_3$ |
| $SbO_2H$ | |

Reaction of terminally reactive polymer containing alkali metal atoms with the acid forming reagents can be carried out over a wide range of temperatures, e.g., $-75°$ C. to $+75°$ C., and preferably utilizing an amount of reagent in excess of stoichiometric. The following reactions present examples of specific methods which can be employed to introduce the terminal acidic groups. In these equations, A designates a polymer chain.

(1) $Li\text{—}A\text{—}Li + 2CO_2 \rightarrow LiCO_2\text{—}A\text{—}CO_2Li$
$LiCO_2\text{—}A\text{—}CO_2Li + 2HCl \rightarrow$
$HOOC\text{—}A\text{—}COOH + 2LiCl$ (2) $Li\text{—}A\text{—}Li + SO_2Cl_2 \rightarrow LiSO_2Cl_2\text{—}A\text{—}SO_2Cl_2Li$
$LiSO_2Cl_2\text{—}A\text{—}SO_2Cl_2Li + 2H_2O \rightarrow$
$HO_3S\text{—}A\text{—}SO_3H + 2LiCl + 2HCl$ The aziridinyl-substituted triazines and triphosphatriazines employed in this invention are the 1-aziridinyl- 1,3,5-triazines and the 1-aziridinyl-2,4,6-triphospha-1,3,5-triazines. This can be represented by the formulas

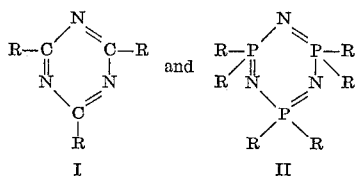

wherein R is a radical selected from the group consisting of a 1-aziridinyl radical which can be represented by the formula

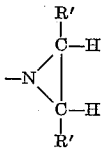

hydrogen, an alkyl, cycloalkyl, aryl, aralkyl, and alkaryl radical, each hydrocarbon radical containing from 1 to 12 carbon atoms, and the R' radicals are selected from the group consisting of hydrogen, alkyl, cycloalkyl, aryl, aralkyl, and alkaryl radicals, and R' can be alike or different, the R's in each aziridinyl radical containing up to and including a total of 20 carbon atoms. In the foregoing formulas, at least three of the R groups are 1-aziridinyl radicals. Thus, each of the R groups in Formula I is an aziridinyl radical.

Examples of compounds represented by Formula I are:
2,4,6-tri(1-aziridinyl)1,3,5-triazine
2,4,6-tri(2-methyl-1-aziridinyl)1,3,5-triazine
2,4,6-tri(2,3-dimethyl-1-aziridinyl)1,3,5-triazine
2,4,6-tri(2-isopropyl-1-aziridinyl)1,3,5-triazine
2,4,6-tri(2-methyl-3-ethyl-1-aziridinyl)1,3,5-triazine
2,4,6-tri(2-methyl-3-n-butyl-1-aziridinyl)1,3,5-triazine
2,4,6-tri(2-hexyl-1-aziridinyl)1,3,5-triazine
2,4,6-tri(2,3-diheptyl-1-aziridinyl)1,3,5-triazine
2,4,6-tri(2-methyl-3-octyl-1-aziridinyl)1,3,5-triazine
2,4,6-tri(2-ethyl-3-decyl-1-aziridinyl)1,3,5-triazine
2,4,6-tri(2-dodecyl-1-aziridinyl)1,3,5-triazine
2,4,6-tri(2-methyl-3-tridecyl-1-aziridinyl)1,3,5-triazine
2,4,6-tri(2-ethyl-3-octadecyl-1-aziridinyl)1,3,5-triazine
2,4,6-tri(2-eicosyl-1-aziridinyl)1,3,5-triazine
2,4,6-tri(2-methyl-3-cyclopentyl-1-aziridinyl)1,3,5-triazine
2,4,6-tri(2-ethyl-3-cyclohexyl-1-aziridinyl)1,3,5-triazine
2,4,6-tri(2-n-butyl-3-(4-methylcyclohexyl)1-aziridinyl)1,3,5-triazine
2,4,6-tri(2-phenyl-1-aziridinyl)1,3,5-triazine
2,4,6-tri(2-phenyl-3-tetradecyl-1-aziridinyl)1,3,5-triazine
2,4,6-tri(2,3-diphenyl-1-aziridinyl)1,3,5-triazine
2,4,6-tri(2-tert-butyl-3-phenyl-1-aziridinyl)1,3,5-triazine
2,4,6-tri(2-ethyl-3-(1-napthyl)1-aziridinyl)1,3,5-triazine
2,4,6-tri(2-n-propyl-3-(2-napthyl)1-aziridinyl)1,3,5-triazine
2,4,6-tri(2-methyl-3-benzyl-1-aziridinyl)1,3,5-triazine
2,4,6-tri(2-nonyl-3-benzyl-1-aziridinyl)1,3,5-triazine
2,4,6-tri(2-n-propyl-3-(2-phenylethyl)1-aziridinyl)1,3,5-triazine
2,4,6-tri(2-methyl-3-(4-methylphenyl)1-aziridinyl)1,3,5-triazine
2,4,6-tri(2-ethyl-3-(3-n-propylphenyl)1-aziridinyl)1,3,5-triazine
2,4,6-tri(2-heptyl-3-(2,4-dimethylphenyl)1-aziridinyl)1,3,5-triazine
2,4,6-tri(2,3-diethyl-1-aziridinyl)1,3,5-triazine
2,4,6-tri(2-methyl-3-isopropyl-1-aziridinyl)1,3,5-triazine
2,4,6-tri(2-tert-butyl-1-aziridinyl)1,3,5-triazine
2,4,6-tri(2,3-didecyl-1-aziridinyl)1,3,5-triazine
2,4,6-tri(2-ethyl-3-pentadecyl-1-aziridinyl)1,3,5-triazine
2,4,6-tri(2-methyl-3-cyclohexyl-1-aziridinyl)1,3,5-triazine
2,4,6-tri(2-phenyl-3-benzyl-1-aziridinyl)1,3,5-triazine
2,4,6-tri(2-ethyl-3-phenyl-1-aziridinyl)1,3,5-triazine
2,4,6-tri(2-amyl-3-benzyl-1-aziridinyl)1,3,5-triazine Examples of compounds represented by Formula II include the following:
2,4,6-tri(1-aziridinyl)2,4,6-triphospha-1,3,5-triazine
2,4,6-tri(2-methyl-1-aziridinyl)2,4,6-triphospha-1,3,5-triazine
2,4,6-tri(2,3-dimethyl-1-aziridinyl)2,4,6-triphospha-1,3,5-triazine
2,4,6-tri(2-isopropyl-1-aziridinyl)2,4,6-triphospha-1,3,5-triazine
2,4,6-tri(2-methyl-3-ethyl-1-aziridinyl)2,4,6-triphospha-1,3,5-triazine
2,4,6-tri(2-methyl-3-n-butyl-1-aziridinyl)2,4,6-triphospha-1,3,5-triazine
2,4,6-tri(2-hexyl-1-aziridinyl)2,4,6-triphospha-1,3,5-triazine
2,4,6-tri(2,3-diheptyl-1-aziridinyl)2,4,6-triphospha-1,3,5-triazine
2,4,6-tri(2-methyl-3-octyl-1-aziridinyl)2,4,6-triphospha-1,3,5-triazine
2,4,6-tri(2-ethyl-3-decyl-1-aziridinyl)2,4,6-triphospha-1,3,5-triazine
2,4,6-tri(2-dodecyl-1-aziridinyl)2,4,6-triphospha-1,3,5-triazine
2,4,6-tri(2-methyl-3-tridecyl-1-aziridinyl)2,4,6-triphospha-1,3,5-triazine
2,4,6-tri(2-ethyl-3-octadecyl-1-aziridinyl)2,4,6-triphospha-1,3,5-triazine
2,4,6-tri(2-eicosyl-1-aziridinyl)2,4,6-triphospha-1,3,5-triazine
2,4,6-tri(2-methyl-3-cyclopentyl-1-aziridinyl)2,4,6-triphospha-1,3,5-triazine
2,4,6-tri(2-ethyl-3-cyclohexyl-1-aziridinyl)2,4,6-triphospha-1,3,5-triazine
2,4,6-tri(2-n-butyl-3-(4-methylcyclohexyl)1-aziridinyl)-2,4,6-triphospha-1,3,5-triazine
2,4,6-tri(2-phenyl-1-aziridinyl)2,4,6-triphospha-1,3,5-triazine
2,4,6-tri(2-phenyl-3-tetradecyl-1-aziridinyl)2,4,6-triphospha-1,3,5-triazine
2,4,6-tri(2,3-diphenyl-1-aziridinyl)2,4,6-triphospha-1,3,5-triazine
2,4,6-tri(2-tert-butyl-3-phenyl-1-aziridinyl)2,4,6-triphospha-1,3,5-triazine
2,4,6-tri(2-ethyl-3-(1-naphthyl)1-aziridinyl)2,4,6-triphospha-1,3,5-triazine
2,4,6-tri(2-n-propyl-3-(2-naphthyl)1-aziridinyl)2,4,6-triphospha-1,3,5-triazine
2,4,6-tri(2-methyl-3-benzyl-1-aziridinyl)2,4,6-triphospha-1,3,5-triazine
2,4,6-tri(2-nonyl-3-benzyl-1-aziridinyl)2,4,6-triphospha-1,3,5-triazine
2,4,6-tri(2-n-propyl-3-(2-phenylethyl)1-aziridinyl)2,4,6-triphospha-1,3,5-triazine
2,4,6-tri(2-methyl-3-(4-methylphenyl)1-aziridinyl)2,4,6-triphospha-1,3,5-triazine
2,4,6-tri(2-ethyl-3-(3-n-propylphenyl)1-aziridinyl)2,4,6-triphospha-1,3,5-triazine
2,4,6-tri(2-heptyl-3-(2,4-dimethylphenyl)1-aziridinyl)-2,4,6-triphospha-1,3,5-triazine
2,4,6-tri(2,3-diethyl-1-aziridinyl)2,4,6-triphospha-1,3,5-triazine
2,4,6-tri(2-methyl-3-isopropyl-1-aziridinyl)2,4,6-triphospha-1,3,5-triazine
2,4,6-tri(2-tert-butyl-1-aziridinyl)2,4,6-triphospha-1,3,5-triazine
2,4,6-tri(2,3-dodecyl-1-aziridinyl)2,4,6-triphospha-1,3,5-triazine
2,4,6-tri(2-ethyl-3-pentadecyl-1-aziridinyl)2,4,6-triphospha-1,3,5-triazine
2,4,6-tri(2-methyl-3-cyclohexyl-1-aziridinyl)2,4,6-triphospha-1,3,5-triazine
2,4,6-tri(2-phenyl-3-benzyl-1-aziridinyl)2,4,6-triphospha-1,3,5-triazine
2,4,6-tri(2-ethyl-3-phenyl-1-aziridinyl)2,4,6-triphospha-1,3,5-triazine 2,4,6-tri(2-amyl-3-benzyl-1-aziridinyl)2,4,6-triphospha-1,3,5-triazine
2,2,4,4,6,6-hexa(2-methyl - 1 - aziridinyl)2,4,6-triphospha-1,3,5-triazine, hereinafter referred to as hexa-2-methyl-1-aziridinyltriphosphatriazine
2,2,4,4,6,6-hexa(1-aziridinyl)2,4,6-triphospha-1,3,5-triazine
2,2,4,4,6,6-hexa(2,3-diethyl-1-aziridinyl)2,4,6-triphospha-1,3,5-triazine
2,2,4,6-tetra(2-hexyl-1-aziridinyl)2,4,6-triphospha-1,3,5-triazine
2,2,4,4,6-penta(2-methyl-3-n-butyl-1-aziridinyl)2,4,6-triphospha-1,3,5-triazine
2,4,6-tri(2-methyl-1-aziridinyl)2,4,6-trimethyl-2,4,6-triphospha-1,3,5-triazine
2,2,4,6-tetra(2-isopropyl-1-aziridinyl)4,6-diethyl-2,4,6-triphospha-1,3,5-triazine
2,2,4,4,6-penta(2-methyl-3-n-butyl-1-aziridinyl)-6-phenyl-2,4,6-triphospha-1,3,5-triazine
2,4,6-tri(2-ethyl-1-aziridinyl)2,4,6-tri(n-dodecyl)2,4,6-triphospha-1,3,5-triazine
2,4,6-tri(2,3-di-n-butyl-1-aziridinyl)2,4,6-tri(3-n-hexylphenyl)2,4,6-triphospha-1,3,5-triazine
2,4,6-tri(2,3-di-n-eicosyl-1-aziridinyl)2,4,6-tri(2-ethyl-4-cyclohexylbutyl)2,4,6-triphospha-1,3,5-triazine Organic peroxides which can be used in conjunction with the hereinbefore described 1-aziridinyltriazines and 1-aziridinyltriphosphatriazines have the general formula

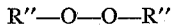

R″—O—O—R″ wherein each R″ is selected from the group consisting of alkyl, cycloalkyl, aryl, alkaryl, aralkyl, and acyl radicals containing from 1 to 15 carbon atoms. Examples of suitable organic peroxides include:

Dimethyl peroxide
Methyl ethyl peroxide
Di-tert-butyl peroxide
Di-tert-amyl peroxide
Di-n-hexyl peroxide
n-Butyl n-amyl peroxide
Dicyclohexyl peroxide
Dicyclopentyl peroxide
Di(methylcyclohexyl) peroxide
Diphenyl peroxide
Di-4-tolyl peroxide
Di(2,4,6-trimethylphenyl) peroxide
Phenyl benzyl peroxide
Tert-butyl phenyl peroxide
Dibenzoyl peroxide
Diacetyl peroxide
Dibenzyl peroxide
Bis(alpha-methylbenzyl) peroxide
Bis(alpha-ethylbenzyl) peroxide
Bis(alpha-n-propylbenzyl) peroxide
Bis(alpha-isopropylbenzyl) peroxide
Bis(alpha,alpha-dimethylbenzyl) peroxide, also referred to as dicumyl peroxide
Bis(alpha,alpha-diethylbenzyl) peroxide
Bis(alpha,alpha-di-n-propylbenzyl) peroxide
Bis(alpha,alpha-diisopropylbenzyl) peroxide
Bis(alpha-methyl-alpha-ethylbenzyl) peroxide
Bis(alpha-ethyl-alpha-isopropylbenzyl) peroxide
Bis(alpha-methyl-alpha-tert-butylbenzyl) peroxide
Bis(alpha,alpha-dimethyl-3-methylbenzyl) peroxide
Bis(alpha,alpha-diethyl-2-ethylbenzyl) peroxide
Bis(alpha-methyl-alpha-ethyl-3-tert-butylbenzyl) peroxide
Bis(alpha,alpha-dimethyl-2,4-dimethylbenzyl) peroxide
Bis(alpha,alpha-dimethyl-4-isopropylbenzyl) peroxide
Bis(alpha,alpha-diisopropyl-4-ethylbenzyl) peroxide
Bis(alpha-methyl-alpha-ethyl-4-isopropylbenzyl) peroxide
Bis(alpha,alpha-diethyl-4-isopropylbenzyl) peroxide
Bis(alpha,alpha-diisopropyl-2-ethylbenzyl) peroxide
Bis(alpha,alpha-dimethyl-4-tert-butylbenzyl) peroxide
Bis(alpha,alpha-diethyl-4-tert-butylbenzyl) peroxide
Benzyl alpha-methylbenzyl peroxide
Benzyl alpha-methyl-4-methylbenzyl peroxide
Benzyl alpha-methyl-4-isopropylbenzyl peroxide
Benzyl alpha,alpha-dimethylbenzyl peroxide
Benzyl alpha,alpha-dimethyl-4-methylbenzyl peroxide
Benzyl alpha,alpha-dimethylbenzyl-4-isopropylbenzyl peroxide
Alpha,alpha,alpha′-trimethyldibenzyl peroxide
Alpha-methyl-alpha,alpha′-diethyl-alpha′-n-propyldibenzyl peroxide
Alpha-methyl-alpha,alpha′,alpha,alpha′-triisopropyl-dibenzyl peroxide
Alpha,alpha-dimethyl-alpha′,alpha′-di-n-butyldibenzyl peroxide
Bis[dimethyl(1-naphthyl)methyl] peroxide
Bis[diethyl(2-naphthyl)methyl] peroxide
Bis(alpha,alpha-diethyl) peroxide The aziridinyltriazine-type curatives can be added to or incorporated into the polymers in the same manner employed when adding other types of curatives to liquid, rubbery, or plastic materials, e.g., by blending the ingredients on a roll mill or in a Banbury mixer. In some instances, particularly when the polymer is a liquid, a portion of the aziridinyltriazine or aziridinyltriphosphatriazine is blended with the polymer, the mixture is heated to effect a partial cure, and the remainder of this curative, together with such other compounding ingredients desired, are then incorporated into the partially cured composition. Various types of compounding ingredients, including fillers, such as carbon black and mineral fillers, can be incorporated into the polymeric material if desired.

Reaction of the polymer with the aziridinyltriazine-type curative can be carried out over a wide temperature range, e.g., from about 40 to 500° F., with the preferred temperature in the range from 150 to 400° F. The temperature generally does not exceed 350° F. when an organic peroxide is employed as an auxiliary curative. The curing time can vary from a few minutes to several hours, say, from two minutes to 24 hours or longer depending upon the polymer being cured as well as upon the temperature.

The amount of aziridinyltriazine-type curative is ordinarily in the range from 0.02 to 10 parts by weight per 100 parts of polymer. When an organic peroxide is used, the amount of this material is generally in the range from 0.05 to 5 parts by weight per 100 parts of polymer. Ordinarily the ratio, in parts by weight, of aziridinyltriazine-type compound to organic peroxide is at least 1:1 but it can be less, even as low as 0.25:1 in some instances. When the polymer being cured has terminally reactive groups, it is preferred that at least a stoichiometric amount of the aziridinyltriazine-type curative be employed but an amount slightly below this can be used, e.g., from 80 to 90 percent of stoichiometric to a large excess, even up to 300 percent of stoichiometric. One skilled in the art in possession of this disclosure, having studied the same, will recognize that it is possible to vary somewhat the amounts or ratios given, depending upon the particular polymer, reacting agent and result desired. Thus, the reacting agent or curative can be used in lesser or greater amounts than those given but this now is not preferred. Thus, one skilled in the art will recognize that a basic concept is in the use of the reactant or curative rather than in the parts by weight when considering the broad aspects of the invention. The temperature at which reaction with the polymer will take place, though given herein as now preferred, can be varied somewhat outside the limits given depending upon the particular circumstances as one skilled in the art in possession of this disclosure will understand. Thus, the concept of the invention is to bring about the reaction and this one skilled in the art will know how to do, having studied this disclosure.

This invention provides a method for converting liquid, semi-solid, solid polymers to vulcanized rubbery and cross-linked plastic products. A wide variety of polymer compositions which can be obtained include materials which are suitable as adhesives, potting compounds, tread stocks, and various types of molded objects. Polymers which contain unreacted terminal acidic groups adhere to metal surfaces. Thus, partially reacted or cured polymers are valuable for use in metal adhesive compositions. They can also be used in the production of laminates in which one or more of the plies are metals.

The following examples are presented in illustration of the invention. However, the specific materials and conditions used are typical only and should not be construed to limit the invention unduly.

EXAMPLE I

A lithium-naphthalene-dimethylbutadiene polymerization initiator was prepared in accordance with the following recipe:

| | |
|---|---|
| Lithium, mols | 3 |
| Naphthalene, mols | 1 |
| 2,3-dimethyl-1,3-butadiene, mols | 1 |
| Diethyl ether, mols | 5 |
| Temperature, °F | 41 |
| Time, hours | 66 |

The following recipe was used for polymerizing butadiene in the presence of the above-described initiator:

| | |
|---|---|
| 1,3-butadiene, parts by weight | 100 |
| Toluene, parts by weight | 1,200 |
| Initiator, millimoles | 20 |
| Temperature, °F | 122 |
| Time, hours | 1 |
| Conversion, percent | 100 |

Charge order: Toluene, heat to polymerization temperature, initiator, butadiene.

Polymerization was carried out in an atmosphere of nitrogen in a 20-gallon stainless steel reactor equipped with an agitator. Butadiene was dried by passing it through silica gel. Toluene was dried by first passing it through bauxite and then through a column countercurrent to a pre-purified nitrogen stream.

The polymer solution was carbonated at blowdown after cooling it to 46° F. The solution was contacted in a Pownell mixing T with excess carbon dioxide passed over activated alumina. The carbonated solution was treated with anhydrous hydrogen chloride in the presence of methyl violet until slightly acid to convert the lithium salt to the carboxy-containing polymer. The lithium chloride, which was present as a finely divided solid, was removed by filtration of the mixture through diatomaceous earth. An antioxidant, 2,2'-methylene-bis(4-methyl-6-tert-butylphenol), was added to the filtered solution using 0.5 part by weight per 100 parts polymer, after which the solvent was removed under vacuum at 212° F. A two hour nitrogen purge was given at the end of the stripping operation to remove last traces of solvent. The product was a liquid which had a carboxy content of 1.03 weight percent and a Brookfield viscosity at 77° F. of 2,496 poises.

The liquid carboxy-containing polymer was cured to a solid product using hexa-2-methyl-1-aziridinyltriphosphatriazine. The polymer was degassed under vacuum at 110° C. (230° F.) for two hours and 60 weight percent of the stoichiometric amount of hexa-2-methyl-1-aziridinyltriphosphatriazine was added. The mixture was heated at 230° F. for 30 minutes to effect a partial cure, after which variable quantities of curative were incorporated into a series of samples of the pre-cured mixture on a roll mill together with 50 parts by weight per 100 parts polymer of high abrasion furnace black (Philblack O [1]). Curing was continued for sixty minutes at 235 or 240° F. and physical properties determined. Results were as follows:

*Table I*

| Run No. | Curative added, percent of stoichiometric | | | Final cure | | Parts curative per 100 parts polymer | Tensile, p.s.i. | Elong., percent | $V_r$ |
|---|---|---|---|---|---|---|---|---|---|
| | Original | Second addition | Total | Temp., °F. | Time, min. | | | | |
| 1 | 60 | 50 | 110 | 240 | 60 | 2.0 | 1,090 | 120 | 0.364 |
| 2 | 60 | 100 | 160 | 240 | 60 | 2.88 | 1,410 | 140 | 0.375 |
| 3 | 60 | 150 | 210 | 240 | 60 | 3.78 | 1,250 | 120 | 0.399 |
| 4 | 60 | 100 | 160 | 235 | 60 | 2.88 | 1,350 | 160 | [1] 0.377 |

[1] Other physical properties determined: Shore hardness, 75; ΔT, °F., 71.3; resilience, percent, 59.8.

The data of Table I show that a liquid carboxy-containing polymer reinforced with carbon black can be cured to an elastomeric product using hexa-2-methyl-1-aziridinyltriphosphatriazine as the curative.

When calculating stoichiometric quantities, it was assumed that the curative is hexafunctional and one aziridinyl group is equivalent to one carboxy group.

EXAMPLE II

A polymerization initiator was prepared as described in Example I and used for the polymerization of butadiene in accordance with the following recipe:

| | |
|---|---|
| 1,3-butadiene, parts by weight | 100 |
| Cyclohexane, parts by weight | 1,400 |
| Initiator, millimoles | 21 |
| Temperature, °F | 122 |
| Time, hours | 3 |
| Conversion, percent | 100 |

The procedure, including carbonation, was the same as described in Example I. The liquid product had a carboxy content of 1.14 weight percent and a Brookfield viscosity at 77° F. of 2,252 poises. It was cured to a solid product using hexa-2-methyl-1-aziridinyltriphosphatriazine. A portion of the curative was added initially after the polymer was degassed under vacuum for 2 hours at 230° F. The mixture was heated for 30 minutes at 230° F. More curative was incorporated into the partially cured polymer on a roll mill together with 50 parts by weight per 100 parts polymer of fast extruding furnace black (Philblack A [2]). Curing was continued 45 minutes at 235° F. The following is a summary of the run:

Curative added, percent of stoichiometric:

| | |
|---|---|
| Original | 55 |
| Second addition | 95 |
| Total | [1] 150 |
| Tensile, p.s.i. | 950 |
| Elongation, percent | 150 |
| $V_r$ | 0.334 |

[1] 3 parts by weight per 100 parts polymer.

These data also show that a liquid carboxy-containing polymer containing carbon black can be cured to a rubbery product using hexa-2-methyl-1-aziridinyltriphosphatriazine as the curative.

[1] Registered trademark.
[2] Registered trademark.

EXAMPLE III

A butadiene/styrene rubber containing terminal hydroxy groups was prepared by treating the copolymer containing terminal lithium atoms with ethylene oxide. The following recipe was employed for preparation of the copolymer:

| | |
|---|---|
| 1,3-butadiene, parts by weight | 70 |
| Styrene, parts by weight | 30 |
| Cyclohexane, parts by weight | 780 |
| 1,2-dilithio-1,2-diphenylethane, mols | 1.2 |
| Temperature, °F | 122 |
| Time, hours | 2 |

After a two hour polymerization period, 40 millimoles per 100 parts monomers of ethylene oxide were added as a 5 molar solution in cyclohexane and the mixture maintained at a temperature of 122° F. for three days. An excess of hydrochloric acid was added and the polymer was coagulated with isopropyl alcohol, washed with water, and dried. It had a Mooney value (ML-4 at 212° F.) of 36.

The hydroxy-containing polymer was compounded in a recipe containing high abrasion furnace black (Philblack O) using dicumyl peroxide as the curative along with variable quantities of hexa-2-methyl-1-aziridinyltriphosphatriazine. The recipe was as follows:

| | Parts by weight |
|---|---|
| Hydroxy-containing polymer | 100 |
| Philblack O | 50 |
| Dicumyl peroxide [1] | 0.6 |
| Hexa-2-methyl-1-aziridinyltriphosphatriazine (HMAT) | Variable |

[1] Added as a commercially available product designated as DiCup 40C containing 40 percent dicumyl peroxide. Amount of this material added was 1.5 parts.

The stocks were cured 45 minutes at 307° F. and physical properties determined. Results were as follows:

Table II

| Run No. | HMAT, phr.[1] | $V_r$ | 300% modulus p.s.i. | Tensile, p.s.i. | Elongation, percent | Shore hardness | $\Delta T$, °F. | Resilience, percent |
|---|---|---|---|---|---|---|---|---|
| 1 | 0.2 | 0.370 | 1,300 | 2,000 | 420 | 63 | 90.0 | 67.2 |
| 2 | 0.5 | 0.361 | 1,260 | 2,640 | 520 | 65 | 80.7 | 68.8 |
| 3 | 1.5 | 0.380 | 1,500 | 2,850 | 460 | 65 | 71.6 | 69.1 |
| 4 | 2.5 | 0.387 | 1,850 | 2,750 | 400 | 64 | 78.0 | 67.2 |
| 5 | | 0.330 | 840 | 2,220 | 620 | 61 | 107 | 66.8 |

[1] Parts by wieght per 100 parts rubber.

The data in Table II show that a tighter cure and lower heat build-up are obtained in the compositions containing hexa-2-methyl-1-aziridinyltriphosphatriazine, and an increase in both tensile strength and modulus is realized when the amount of this curative exceeds 0.2 part by weight per 100 parts rubber.

EXAMPLE IV

The liquid carboxy-containing polymer of Example II was cured in a gum recipe using only the polymer and hexa-2-methyl-1-aziridinyltriphosphatriazine. Two runs were made. In the first run, 55 percent of the stoichiometric amount of curative was added after the polymer was degassed under vacuum for two hours at 230° F. The mixture was heated 45 minutes at 230° F., more of the curative was added to make a total of 110 percent of stoichiometric (2.2 parts by weight per 100 parts polymer), and the composition was cured one hour at 307° F.

In the second run, 110 percent of the stoichiometric amount of hexa-2-methyl-1-aziridinyltriphosphatriazine was incorporated into the polymer initially and the mixture was cured 30 minutes at 250° F. Tensile strength and elongation were determined on both products. Results were as follows:

| Run No. | Tensile, p.s.i. | Elongation, percent |
|---|---|---|
| 1 | 170 | 390 |
| 2 | 170 | 170 |

These data show that the liquid polymer can be cured to an elastomeric product in a gum stock recipe.

EXAMPLE V

Liquid polybutadiene was prepared and carbonated in a manner similar to that described in Example I using an organolithium initiator. The product had a carboxy content of 1.16 weight percent. Two hundred percent of the stoichiometric amount (3.4 parts by weight per 100 parts polymer) of 2,4,6-tri(1-aziridinyl)1,3,5-triazine was added and the polymer was cured by heating two hours at 250° F. An elastomeric product was obtained which had a tensile strength of 100 p.s.i. and an elongation of 210 percent.

EXAMPLE VI

An ethylene/propylene rubbery copolymer (commercial product obtained from Hercules Powder Company containing 30 weight percent propylene; ML-4 at 212° F., 27.5) was compounded in accordance with the following recipe.

| | Parts by weight |
|---|---|
| Ethylene/propylene copolymer | 100 |
| Philblack A | 50 |
| Dicumyl peroxide | 4 |
| Sulfur | 0.6 |
| Hexa-2-methyl-1-aziridinyltriphosphatriazine | 0.3 |

The stocks, with and without hexa-2-methyl-1-aziridinyltriphosphatriazine (HMAT), were cured 45 minutes at 307° F. and physical properties determined. Results were as follows:

| HMAT, phr. | $V_r$ | $\Delta T$., °F. | Resilience, percent |
|---|---|---|---|
| 3 | 0.302 | 69.6 | 67.0 |
| None (control) | 0.243 | 85.0 | 59.6 |

These data show that the composition containing the hexa-2-methyl-1-aziridinyltriphosphatriazine gave a tighter cure and had a lower heat buildup and higher resilience than the control.

EXAMPLE VII

A lithium-methylnaphthalene-isoprene-butadiene initiator composition was prepared in accordance with the following formulation:

| | Mols |
|---|---|
| Lithium pellets | 3.0 |
| Methylnaphthalene | 1.0 |
| Isoprene | 1.0 |
| Diethyl ether | 4.5 |
| 1,3-butadiene | 4.0 |

The lithium pellets were washed with n-hexane and dried over nitrogen gas. The methylnaphthalene was purchased as a commercial mixture of 1- and 2-methylnaphthalenes. It was treated with activated alumina to remove traces of moisture. Isoprene was flashed to remove inhibitor and dried by stripping with nitrogen gas. Diethyl ether was dried over calcium hydride. Butadiene was flashed to remove inhibitor and dried over silica gel.

Preparation of the initiator was effected in an atmosphere of nitrogen. Ether was charged first followed by the methylnaphthalene and isoprene. The temperature was adjusted to −15° F., lithium was added, and the mixture was agitated for approximately 30 hours, this being the time for the reaction to reach quantitative conversion. Butadiene addition was started and when the heat of reaction caused the temperature to reach 80° F., the rate of addition was regulated to maintain the temperature between 60 and 80° F. This initiator composition was used for the polymerization of butadiene in a series of runs in accordance with the following recipe:

| | |
|---|---|
| 1,3-butadiene, parts by weight | 100 |
| Cyclohexane, parts by weight | 1,350 |
| Initiator, millimoles | 26.7–31.0 |
| Temperature, ° F. | 122 |
| Time to quantitative conversion, hours | <2 |

The polymer solution was carbonated at blowdown after cooling it to 41° F. Tetrahydrofuran (1.5 parts by weight per 100 parts butadiene) was added and the polymer solution was contacted in a Pownell mixing T with excess carbon dioxide passed over activated alumina. Following is a summary of six 1,000-gallon runs:

*Table III*

| Run No. | Initiator charge, millimoles | Solution rate, gal./min. | $CO_2$ used, pounds | $CO_2$ rate, lbs./min. | Total carbonation time, hours | COOH, percent | Brookfield viscosity, poise at 77° F. |
|---|---|---|---|---|---|---|---|
| 1 | 30 | 13.5 | 850 | 9.96 | 1.42 | 1.62 | 484 |
| 2 | 30 | 15 | 1,000 | 13.0 | 1.28 | 1.85 | 380 |
| 3 | 26.7 | 15 | 450 | 5.9 | 1.28 | 1.45 | 600 |
| 4 | 30 | 46 | 500 | 20.0 | 0.416 | 1.82 | 360 |
| 5 | 31 | 50 | 200 | 8.7 | 0.383 | 1.46 | 560 |
| 6 | 31 | 50 | 300 | 13.0 | 0.383 | 1.61 | 496 |

An 80-gallon polymerization run was made using the same recipe and carbonation procedure except that no tetrahydrofuran was added prior to carbonation. Carbon dioxide was added at a rate of 2.5 gallons per minute and 196 pounds was used. Polymer temperature during carbonation was 32–38° F.

After carbonation, anhydrous hydrogen chloride gas was added to each batch in sufficient quantity to fluidize it but not to effect complete neutralization. The partially neutralized batches were transferred to a blend tank and enough more anhydrous hydrogen chloride was introduced to complete the neutralization. Diatomaceous earth (Dicalite) was added and the mixture was filtered. The liquid carbonated polymer was recovered by stripping the solvent. It had a carboxy content of 1.66 weight percent and an inherent viscosity of 0.25.

Variable amounts of 2,4,6-tri(1-aziridinyl)1,3,5-triazine (TAT), hexa-2-methyl-1-aziridinyltriphosphatriazine (HMAT), and tri(2-methyl-1-aziridinyl)phosphine oxide (MAPO) were employed as curatives for the liquid carboxy-containing polymer varying both the temperature and time of cure. The curative was blended with the polymer, with no other materials added. The results were as follows:

*Table IV*

| Curative | Cure temp., ° F. | Concentration of curing agent | | Cure time, hours | $V_r{}^2$ | 80° F. | | | | | −90° F. | | | |
|---|---|---|---|---|---|---|---|---|---|---|---|---|---|---|
| | | Parts [1] | Equivalents | | | 100% mod., p.s.i. | Tensile, p.s.i. | Elong., percent | Shore A hardness | Lupke rebound, percent [3] | 100% mod., p.s.i. | 300% mod., p.s.i. | Tensile, p.s.i. | Elong., percent |
| TAT | 307 | 2.75 | 1.1 | 1 | 0.172 | ([4]) | ([4]) | ([4]) | ([4]) | ([4]) | | | | |
| | | | | 2 | 0.140 | 20 | 45 | 520 | | | | | | |
| | | 3.75 | 1.5 | 1 | 0.167 | 25 | 75 | 650 | | | 420 | 780 | 2,770 | 740 |
| | | | | 2 | 0.180 | 25 | 85 | 720 | 32 | 48 | 390 | 830 | 3,550 | 780 |
| | | 5.00 | 2.0 | 1 | 0.229 | 60 | 160 | 410 | | | | | | |
| | | | | 2 | 0.192 | 50 | 140 | 510 | 37 | 55 | 360 | 840 | 3,280 | 780 |
| | 250 | 2.75 | 1.1 | 0.5 | | ([4]) | ([4]) | ([4]) | ([4]) | ([4]) | | | | |
| | | | | 1 | 0.227 | 25 | 55 | 340 | | | | | | |
| | | | | 2 | 0.178 | 25 | 75 | 410 | 30 | 50 | | | | |
| | | 3.75 | 1.5 | 0.5 | 0.246 | 90 | 145 | 270 | | | 440 | 880 | 3,700 | 870 |
| | | | | 1 | 0.249 | 80 | 140 | 280 | | | 430 | 800 | 3,410 | 760 |
| | | | | 2 | 0.237 | 60 | 120 | 340 | 45 | 66 | 470 | 870 | 3,430 | 800 |
| | | 5.00 | 2.0 | 0.5 | 0.138 | 140 | 200 | 160 | | | 550 | 1,090 | 3,330 | 530 |
| | | | | 1 | 0.318 | 130 | 150 | 130 | | | 440 | 900 | 3,510 | 770 |
| | | | | 2 | 0.298 | 120 | 175 | 190 | 53 | 78 | 400 | 870 | 3,680 | 770 |
| | 200 | 2.75 | 1.1 | 0.5 | | ([5]) | ([5]) | ([5]) | ([5]) | ([5]) | | | | |
| | | | | 1 | 0.205 | ([4]) | ([4]) | ([4]) | ([4]) | ([4]) | | | | |
| | | | | 2 | 0.210 | 40 | 90 | 420 | 39 | 60 | | | | |
| | | 3.75 | 1.5 | 0.5 | 0.233 | 45 | 145 | 500 | | | 380 | 820 | 3,220 | 840 |
| | | | | 1 | 0.265 | 85 | 160 | 300 | | | 420 | 860 | 3,310 | 840 |
| | | | | 2 | 0.263 | 95 | 150 | 250 | 50 | 77 | 410 | 830 | 3,670 | 840 |
| | | 5.00 | 2.0 | 0.5 | 0.273 | 55 | 155 | 460 | | | 550 | 990 | 3,720 | 820 |
| | | | | 1 | 0.277 | 100 | 150 | 240 | | | | | | |
| | | | | 2 | 0.287 | 110 | 170 | 210 | 55 | 80 | 470 | 1,030 | 3,930 | 800 |
| | 80 | 2.75 | 1.1 | 98 | 0.256 | 65 | 130 | 320 | | | | | | |
| | | | | 360 | 0.271 | 85 | 120 | 190 | | | | | | |
| | | 3.75 | 1.5 | 98 | 0.258 | 70 | 140 | 340 | | | | | | |
| | | | | 360 | 0.276 | 90 | 130 | 200 | | | | | | |
| | | 5.0 | 2.0 | 98 | 0.260 | 65 | 120 | 290 | | | | | | |
| | | | | 360 | 0.276 | 90 | 135 | 210 | | | | | | |
| HMAT | 307 | 3.2 | 1.1 | 1 | 0.177 | 25 | 135 | 490 | | | 460 | 720 | 2,640 | 820 |
| | | | | 2 | 0.177 | 20 | 150 | 490 | 18 | 46 | 400 | 720 | 2,730 | 910 |
| | | 4.4 | 1.5 | 0.5 | 0.256 | 70 | 110 | 200 | | | 420 | 680 | 2,970 | 910 |
| | | | | 1 | 0.251 | 70 | 120 | 200 | | | 380 | 610 | 2,810 | 870 |
| | | | | 2 | 0.248 | 70 | 110 | 200 | 32 | 57 | 390 | 690 | 2,870 | 860 |
| | | 5.8 | 2.0 | 0.5 | 0.278 | 85 | 150 | 210 | | | 470 | 830 | 3,480 | 900 |
| | | | | 1 | 0.283 | 85 | 160 | 210 | | | 540 | 900 | 3,670 | 950 |
| | | | | 2 | 0.297 | 110 | 180 | 190 | 46 | 68 | 490 | 960 | 4,100 | 920 |
| | 250 | 3.2 | 1.1 | 1 | 0.199 | 25 | 150 | 550 | | | 420 | 750 | 3,040 | 880 |
| | | | | 2 | 0.227 | 35 | 100 | 320 | 32 | 53 | 470 | 740 | 3,190 | 970 |
| | | 4.4 | 1.5 | 0.5 | 0.225 | 40 | 105 | 340 | | | 520 | 880 | 3,050 | 770 |

Table IV—Continued

| Curative | Cure temp., °F. | Concentration of curing agent | | Cure time, hours | $V_r^2$ | 80° F. | | | | | -90° F. | | | |
|---|---|---|---|---|---|---|---|---|---|---|---|---|---|---|
| | | Parts[1] | Equivalents | | | 100% mod., p.s.i. | Tensile, p.s.i. | Elong., percent | Shore A hardness | Lupke rebound, percent[3] | 100% mod., p.s.i. | 300% mod., p.s.i. | Tensile, p.s.i. | Elong., percent |
| MAPO | 200 | 5.8 | 2.0 | 1 | 0.252 | 65 | 130 | 250 | | | 370 | 570 | 3,580 | 1,030 |
| | | | | 2 | 0.270 | 85 | 140 | 200 | 45 | 69 | 430 | 730 | 3,690 | 1,020 |
| | | | | 0.5 | 0.248 | 60 | 160 | 350 | | | 430 | 690 | 4,280 | 1,010 |
| | | | | 1 | 0.277 | 85 | 150 | 230 | | | 450 | 700 | 3,750 | 980 |
| | | | | 2 | 0.288 | 90 | 165 | 220 | 45 | 71 | 390 | 770 | 4,000 | 950 |
| | | 3.2 | 1.1 | 1 | 0.156 | | 40 | 900 | | | 560 | 900 | 3,290 | 830 |
| | | | | 2 | 0.172 | 10 | 80 | 650 | | | 520 | 810 | 3,190 | 930 |
| | | 4.4 | 1.5 | 1 | 0.179 | 10 | 95 | 710 | | | 590 | 930 | 3,740 | 890 |
| | | | | 2 | 0.215 | 25 | 125 | 500 | | | 520 | 850 | 3,860 | 910 |
| | | 5.8 | 2.0 | 1 | 0.191 | 25 | 120 | 590 | | | 500 | 710 | 4,080 | 1,040 |
| | | | | 2 | 0.232 | 40 | 120 | 390 | | | 490 | 780 | 3,810 | 960 |
| | 307 | 4.5 | 1.5 | 15 | 0.110 | <10 | 50 | 680 | | | | | | |
| | | | | 63 | 0.174 | 20 | 90 | 390 | | | | | | |
| | | 6 | 2.0 | 15 | 0.114 | <10 | 55 | 460 | | | | | | |
| | | | | 63 | 0.168 | 25 | 170 | 520 | | | | | | |
| | 250 | 4.5 | 1.5 | 15 | 0.145 | <10 | 90 | 720 | | | | | | |
| | | | | 63 | 0.127 | 10 | 85 | 620 | | | | | | |
| | | 6 | 2.0 | 15 | 0.133 | <10 | 50 | 550 | | | | | | |
| | | | | 63 | 0.146 | 10 | 55 | 370 | | | | | | |
| | 200 | 4.5 | 1.5 | 15 | | (4) | (4) | (4) | | | | | | |
| | | | | 63 | | (4) | (4) | (4) | | | | | | |
| | | 6 | 2.0 | 15 | | (4) | (4) | (4) | | | | | | |
| | | | | 63 | 0.138 | <10 | 65 | 800 | | | | | | |

[1] Parts by weight per 100 parts polymer.
[2] Volume fraction of polymer in swollen gel. Determined according to the method of Kraus, Rubber World 135, No. 1, 67–73 (1956).
[3] Apparatus and test method as described in Vanderbilt Rubber Handbook, page 220 (1958).
[4] Undercured.  [5] No cure.

The data in Table IV show that a much faster cure rate is realized with TAT or HMAT than is obtained with MAPO. A comparison of results ($V_r$ values) obtained with the same curative level at 307° F. shows that TAT and HMAT will cure the polymer in 1 or 2 hours to about the same or higher level than is reached with MAPO in 63 hours. As the curing temperature is lowered, MAPO becomes much slower than the other materials.

Reasonable variation and modification are possible within the scope of the foregoing disclosure and the appended claims to the invention, the essence of which is that there has been provided an improved method or process of reacting and/or curing a polymeric material with a multifunctional aziridinyl compound selected from the group consisting of 1-aziridinyltriazines and 1-aziridinyltriphosphatriazines, and the novel products resulting from said process.

I claim:
1. A process which comprises reacting a polymeric material selected from the group consisting of natural rubber, synthetic polymers of monomers containing a vinylidene group and synthetic polymers having the formula $AY_n$ wherein A comprises a polymer of monomers containing a vinylidene group, Y is a terminally reactive group and $n$ is an integer of at least 2, with an organic peroxide and a reactant material selected from the group consisting of compounds having the formula

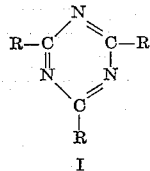

I and compounds having the formula

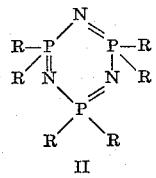

II wherein R is a radical selected from the group consisting of a 1-aziridinyl radical which can be represented by the formula

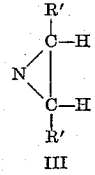

III hydrogen, an alkyl, cycloalkyl, aryl, aralkyl, and alkaryl radical, each hydrocarbon radical containing from 1 to 12 carbon atoms, and the R' radicals are selected from the group consisting of hydrogen, alkyl, cycloalkyl, aryl, aralkyl and alkaryl radicals, the R's in each aziridinyl radical containing up to and including a total of 20 carbon atoms, at least three of the R groups of Formulas I and II being 1-aziridinyl radicals, said reactant material and said organic peroxide being present in amounts sufficient to effect a substantial curing of said polymeric material.

2. A process according to claim 1 wherein each R' is alike.

3. A process according to claim 1 wherein each R' is different.

4. A process which comprises reacting a synthetic polymeric material having the formula $AY_n$ where A comprises a polymer of monomers containing a vinylidene group, Y is a terminally reactive group and $n$ is an integer of at least 2, with a reactant material selected from the group consisting of compounds of Formula I and compounds of Formula II, wherein R is a radical selected from the group consisting of a 1-aziridinyl radical which can be represented by Formula III, hydrogen, an alkyl, cycloalkyl, aryl, aralkyl, and alkaryl radical, each hydrocarbon radical containing from 1 to 12 carbon atoms, and R' is selected from the group consisting of hydrogen, alkyl, cycloalkyl, aryl, aralkyl and alkaryl radicals, the R's in each aziridinyl radical containing up to and including a total of 20 carbon atoms, at least three of the R groups of Formulas I and II being 1-aziridinyl radicals, said reactant material being present in an amount sufficient to effect a substantial curing of said polymeric material.

5. A process according to claim 4 wherein said polymeric material is polybutadiene.

6. A process according to claim 4 wherein said polymeric material is polyethylene.

7. A process according to claim 4 wherein said polymeric material is a copolymer of butadiene and styrene.

8. A process according to claim 4 wherein said polymeric material is polypropylene.

9. A composition prepared by the process of claim 4.

10. A method according to claim 4 wherein an admixture of the polymeric material and the material reacted therewith, upon admixture, are placed into a mold and then heated to obtain a molded object.

11. A process according to claim 4 wherein said reactant material is hexa-2-methyl-1-aziridinyltriphosphatriazine.

12. A composition prepared by the process of claim 11.

13. A process which comprises mixing 100 parts by weight of a polymeric material selected from the group consisting of natural rubber, synthetic polymers of monomers containing a vinylidene group, and synthetic polymers having the formula $AY_n$ wherein A comprises a polymer of monomers containing a vinylidene group, Y is a terminally reactive group and $n$ is an integer of at least 2, with from about 0.05 to 5 parts by weight of an organic peroxide having the formula $$R''\text{—O—O—}R''$$

wherein each R'' is selected from the group consisting of alkyl, cycloalkyl, aryl, alkaryl, aralkyl, and acyl and contains 1 to 15 carbon atoms, and about 0.02 to 10 parts by weight of a reactant material selected from the group consisting of compounds of Formula I and compounds of Formula II wherein R is a radical selected from the group consisting of a 1-aziridinyl radical which can be represented by Formula III, hydrogen, an alkyl, cycloalkyl, aryl, aralkyl, and alkaryl radical, each hydrocarbon radical containing from 1 to 12 carbon atoms and R' is selected from the group consisting of hydrogen, alkyl, cycloalkyl, aryl, aralkyl and alkaryl radicals, the R's in each aziridinyl radical containing up to and including a total of 20 carbon atoms, at least three of the R groups of Formulas I and II being 1-aziridinyl radicals.

14. A process according to claim 13 wherein said polymeric material is a polymer of butadiene containing terminal carboxy groups.

15. A process according to claim 13 wherein said polymeric material is a copolymer of butadiene and styrene containing terminal acid groups.

16. A composition prepared by the process of claim 14.

17. A composition prepared by the process of claim 15.

18. A process which comprises mixing 100 parts by weight of a polymeric material selected from the group consisting of natural rubber, synthetic polymers of monomers containing a vinylidene group, and synthetic polymers having the formula $AY_n$ wherein A comprises a polymer of monomers containing a vinylidene group, Y is a terminally reactive group and $n$ is an integer of at least 2, with from about 0.05 to 5 parts by weight of an organic peroxide having the formula $$R''\text{—O—O—}R''$$

wherein each R'' is selected from the group consisting of alkyl, cycloalkyl, aryl, alkaryl, aralkyl, and acyl and contains 1 to 15 carbon atoms, and about 0.02 to 10 parts by weight of a reactant material selected from the group consisting of compounds of Formula I and compounds of Formula II wherein R is a radical selected from the group consisting of a 1-aziridinyl radical which can be represented by Formula III, hydrogen, an alkyl, cycloalkyl, aryl, aralkyl, and alkaryl radical, each hydrocarbon radical conatining from 1 to 12 carbon atoms and R' is selected from the group consisting of hydrogen, alkyl, cycloalkyl, aryl, aralkyl and alkaryl radicals, the R's in each aziridinyl radical containing up to and including a total of 20 carbon atoms, at least three of the R groups of Formulas I and II being 1-aziridinyl radicals, and subjecting the thus formed mixture to a temperature in the range of about 40 to 500° F. for a time in the range of from about 2 minutes to about 24 hours.

19. The process according to claim 18 wherein said polymeric material is a polymer of butadiene, said organic peroxide is dicumyl peroxide, and said reactant material is hexa-2-methyl-1-aziridinyltriphosphatriazine.

20. The process according to claim 18 wherein said polymeric material is a polymer of butadiene, and said reactant material is 2,4,6-tri(1-aziridinyl)1,3,5-triazine.

21. A process which comprises mixing 100 parts by weight of a synthetic polymer having the formula $AY_n$ wherein A comprises a polymer of monomers containing a vinylidene group, Y is a terminally reactive group and $n$ is an integer of at least 2, with about 0.02 to 10 parts by weight of a reactant material selected from the group consisting of compounds of Formula I and compounds of Formula II where R is a radical selected from the group consisting of a 1-aziridinyl radical which can be represented by Formula III, hydrogen, an alkyl, cycloalkyl, aryl, aralkyl, and alkaryl radical, each hydrocarbon radical containing from 1 to 12 carbon atoms, and R' is selected from the group consisting of hydrogen, alkyl, cycloalkyl, aryl, aralkyl and alkaryl radicals, the R's in each aziridinyl radical containing up to and including a total of 20 carbon atoms, at least three of the R groups of Formulas I and II being 1-aziridinyl radicals, and subjecting the thus formed mixture to a temperature in the range of about 40 to 500° F. for a time in the range of from about 2 minutes to about 24 hours.

22. The process according to claim 21 wherein said synthetic polymer is a polymer of butadiene, and said reactant material is 2,4,6-tri(1-aziridinyl)1,3,5-triazine.

23. The process according to claim 21 wherein said synthetic polymer is a polymer of butadiene, and said reactant material is a hexa-2-methyl-1-aziridinyltriphosphatriazine.

References Cited in the file of this patent

UNITED STATES PATENTS

| | | |
|---|---|---|
| 2,460,581 | Jansen | Feb. 1, 1949 |
| 2,653,934 | Kaiser | Sept. 23, 1953 |
| 2,858,306 | Ratz et al. | Oct. 28, 1958 |
| 2,901,444 | Chance | Aug. 25, 1959 |
| 2,915,480 | Reeves | Dec. 1, 1959 |